United States Patent [19]
Micali

[11] Patent Number: 6,137,884
[45] Date of Patent: *Oct. 24, 2000

[54] SIMULTANEOUS ELECTRONIC TRANSACTIONS WITH VISIBLE TRUSTED PARTIES

[75] Inventor: Silvio Micali, Brookline, Mass.

[73] Assignee: Bankers Trust Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/850,399

[22] Filed: May 2, 1997

Related U.S. Application Data

[63] Continuation of application No. 08/700,270, Aug. 20, 1996, Pat. No. 5,629,982, which is a continuation of application No. 08/511,518, Aug. 4, 1995, Pat. No. 5,553,145, which is a continuation-in-part of application No. 08/408,551, Mar. 21, 1995, abandoned.

[51] Int. Cl.[7] ............................................. H04L 9/00
[52] U.S. Cl. ................................. 380/30; 380/25
[58] Field of Search ........................... 380/25, 30

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,438,824 | 3/1984 | Mueller-Schloer | 380/30 |
| 4,458,109 | 7/1984 | Mueller-Schloer | 380/30 |
| 4,789,928 | 12/1988 | Fujisaki . | |
| 4,885,777 | 12/1989 | Takaragi et al. | 380/30 |
| 4,885,789 | 12/1989 | Burger et al. | 380/25 |
| 4,953,209 | 8/1990 | Ryder, Sr. et al. | 380/25 |
| 5,117,358 | 5/1992 | Winkler . | |
| 5,202,977 | 4/1993 | Pasetes, Jr. et al. . | |
| 5,214,700 | 5/1993 | Pinkas et al. | 380/30 |
| 5,220,501 | 6/1993 | Lawlor et al. . | |
| 5,243,515 | 9/1993 | Lee . | |
| 5,276,737 | 1/1994 | Micali | 380/30 |
| 5,315,658 | 5/1994 | Micali | 380/30 |
| 5,440,634 | 8/1995 | Jones et al. | 380/30 |
| 5,453,601 | 9/1995 | Rosen . | |
| 5,455,407 | 10/1995 | Rosen . | |
| 5,497,421 | 3/1996 | Kaufman et al. | 380/30 |
| 5,509,071 | 4/1996 | Petrie, Jr. et al. | 380/30 |
| 5,553,145 | 9/1996 | Micali | 380/30 |
| 5,610,982 | 3/1997 | Micali | 380/30 |
| 5,666,420 | 9/1997 | Micali | 380/30 |

OTHER PUBLICATIONS

Abad–Peiro et al., "Designing a Generic Payment Service" (Nov. 26, 1996).

Asokan et al., "Optimistic Protocols for Multi–Party Fair Exchange," IBM Research Report RZ 2892 (Dec. 9, 1996).

Asokan et al., "Optimistic Fair Exchange of Digital Signatures," IBM Research Report.

Asokan et al., "The State of the Art in Electronic Payment Systems," IEEE Computer, Sep. 1997, pp. 28–35.

Asokan et al., "Optimistic Fair Exchange of Digital signatures" Advances in Cryptology (K. Nyberg, ed.), Proc. Eurocrypt 198 , pp. 591–606 (1997).

(List continued on next page.)

*Primary Examiner*—Salvatore Cangialosi
*Attorney, Agent, or Firm*—Pillsbury Madison & Surto LLP

[57] ABSTRACT

A number of electronic communications methods are described involving a first and a second party (i.e., sender and recipient), with assistance from at least a trusted party, enabling electronic transactions in which the first party has a message for the second party. The first party, the second party and the trusted party undertake an exchange of transmissions, such that if all transmissions reach their destinations the second party only receives the message if the first party receives at least one receipt. Preferably, the identity of the first party is temporarily withheld from the second party during the transaction. At least one receipt received to the first party enables the first party to prove the content of the message received by the second party.

29 Claims, 1 Drawing Sheet-

OTHER PUBLICATIONS

Asokan et al., "Optimistic Protocols for Fair Exchange," IBM Research Report RZ 2858 (Sep. 2, 1996).

Asokan et al., "Server–Supported Signatures," Proceedings of ESORICS '96 (Sep. 25–27, 1996).

Asokan et al., "Server–Supported Signatures," Journal of Computer Security pp. 1–13 (1997).

Asokan et al., "Asynchronous Protocols for Optimistic Fair Exchange," IBM Research Report, Proc. IEEE Symposium on Research in Security and Privacy, pp. 86–99 (1998).

Baetlaan et al., "Internet Billing Service Design and Prototype Implementation," Carnegie Mellon University Information Networking Institute 1992 Final Project (Mar. 30, 1993).

Bellare et al., "iKP—A Family of Secure Electronic Payment Protocols" (Jul. 12, 1995).

Ben–Or et al., "A Fair Protocol for Signing Contracts," IEEE Transactions on Information Theory, v. 36 n. 1, pp. 40–46 (Jan. 1990).

Ben–Or et al., "A Fair Protocol for Signing Contracts," Automata, Languages and Programming, pp. 43–52 (Jul. 1985).

Blum, M., "How to Exchange (Secret) Keys," ACM Transactions on Computer Systems, v. 1 n. 2, pp. 175–193 (May 1983).

Burk et al., "Digital Payment Systems Enabling Security and Unobservability," Computers & Security, v. 8, pp. 399–416 (1989).

Burk et al., "Value Exchange Systems Enabling Security and Unobservability," Computers & Security, v. 9, pp. 715–720 (1990).

Camenisch et al., "Digital Payment Systems with Passive Anonymity–Revoking Trustees" Journal of Computer Security (1996).

Camensich et al., "An Efficient Fair Payment System," Proc. 3rd ACM Conf. on Computer Security, pp. 88–94 (1996).

Casey et al., "Secure Automated Document Delivery," Fifth Annual Computer Security Applications Conference, pp. 348–356 (Dec. 4–8, 1989).

Chaum, D., *Security Without Identification: Transaction Systems to Make Big Brother Obsolete*, Comm of ACM, vol. 28 No. 10, pp. 1030–1044 (Oct. 1985).

Chaum, et al., *Untraceable Electronic Cash*, Proc. Crypto '88, pp. 329–327 (1988).

Cheng, et al., *Design and Implementation of Modular Key Management Protocol and IP Secure Tunnel on AIX*, IBM Thomas J. Watson Research Center (Apr. 28, 1995).

Chor, et al., *Verifiable Secret Sharing and Achieving Simultaneity in the Present of Faults*, POC, 26th FOCS, pp. 383–395.

Damgard, I., *Payment Systems and Credential Mechanisms With Provable Security Against Abuse by Individuals*, Proc Crypto '88, pp. 328–335 (1988).

DeMillo, et al., *Protocols for Data Security*, IEEE Computer, pp. 39–50 (Feb. 1983).

Desmedt, et al., *Threshold Cryptosystems*, University of Wisconsin—Milwaukee, pp. 307–315.

Dolev, et al., *Non–Malleable Cryptography*, Comm. of ACM, pp. 542–552 (Mar. 1991).

Dukach, S., *SNPP: A Simple Network Payment Protocol*, M.I.T. Laboratory for Computer Science.

Even, et al., *A Randomized Protocol for Signing Contracts*, Comm. of the ACM, vol. 28, No. 6, pp. 637–647 (Jun. 1995).

Even, S., *Secure Off–Line Electronic Fund Transfer Between Nontrusting Parties*, Computer Science Department Technion, Israel Institute of Technology, pp. 1–10 (Jan. 31, 1988).

Even, et al., *On–Line/Off–Line Digital Signatures*, International Association for Cryptographic Research, 1996, pp. 0–28.

Frankel, et al., *Indirect Discourse Proofs: Achieving Efficient Fair Off–Line E–Cash*.

Franklin, et al., *Fair Exchange with a Semi–Trusted Third Party*, Proc. of the 4th ACM Conf. on Computer and Comm. Security, Apr. 1997, pp. 1–6.

Goldreich, et al., *How to Play Any Mental Game*, Proc. 27th Ann. IEEE ACM Symposium on Theory of Computing, pp. 218–229 (1987).

Goldreich, et al., *Proofs that Yield Nothing But Their Validity or All Languages in NP Have Zero–Knowledge Proof Systems*, Association for Computing Machinery, vol. 38, No. 1, pp. 691–729 (Jul. 1991).

Goldwasser, et al., *The Knowledge Complexity of Interactive Proof Systems*, SIAM J. Comput. vol. 18, No. 1, pp. 186–208 (Feb. 1989).

Herda, S., *Consulting evidence and proof in digital cooperation*, Computer Standards and Interfaces 17 (1995), pp. 69–79.

Hickman, et al., The *SSL Protocol*, Netscape Communications Corp. (Jun. 1995).

Jakobsson, M., *Reducing Costs in Identification protocols*, Crypto '92 (1992).

Janson, et al., *Electronic Payment Over Open Networks*, IBM Zurich Research Laboratory CH 8803 Ruschlikon, Switzerland (Apr. 18, 1995).

Janson, et al., *Electronic Payment Systems*, pp. 1–24 (May 1, 1996).

Kilian, J., et al., *Identity Escrow*, pp. 1–18.

Koleta, G.B., Cryptographers Gather to Discuss Research, Science, pp. 646–647 (Nov. 11, 1981).

Konheim et al., *Digital Signatures and Authentications*, Cryptography, A Primer, (1981), pp. 334–367.

Low, et al., *Anonymous Credit Cards*, 2nd ACM Conference on Computer and Communication Security, pp. 1–10 (1994).

Luby, et al., *How to Simultaneously Exchange a Secret Bit by Flipping a Symmetrically–Biased Coin*, IEEE, pp. 11–21 (1983).

Myer, P., *Cryptography: A guide for the design and implementation of crytptographic Systems*, McGraw–Hill, Inc., pp. 386–430 (1982).

Mueller–Schloer, et al., *The Implementation of a Cryptography–Based Secure Office System*, AFIPS Conference Proc. 1982, pp. 487–492 (1982).

Needham, et al., *Using Encryption for Authentication in Large Networks of Computers*, Comm. of ACM, vol. 21, No. 12, pp. 993–999 (Dec. 1978).

Pedersen, T., *Electronic Payments of Small Amounts*, Aarhus Univ. Tech. Rpt. DAIMI PB–495, pp. 1–12 (Aug. 1995).

Otway, et al., *Efficient and Timely Mutual Authentication*, ACM Operating Systems Review, vol. 21, No. 1, pp. 8–10 (Jan. 1987).

Neuman, et al., *Requirements for Network Payment: The NetCheque™ Perspective*, Proc. IEEE Compcon '95, San Francisco (Mar. 1995).

Rabin, M., *How To Exchange Secrets*, (May 20, 1981) pp. 1–21.

Rabin, M., *Transaction Protection by Beacons,* TR–29–81, Harvard University Center for Research in Computing Technology, (Nov. 1981) pp. 1–21.

Rescorla et al., *The Secure HyperText Transfer Protocol,* Enterprise Integration Technologies, (Jul. 1995) pp. 1–40.

Rihaczek, K., *Teletrust,* Computer Networks and ISDN Systems 13 (1987) pp. 235–239.

Rivest et al., *A Method for Obtaining Digital Signatures and Public–Key Cryptosystems,* Programming Techniques (Feb. 1978) pp. 120–126.

SEMPER Project AC026 ACTS Programme (Mar./Jul. 1995).

Serenelli et al., *Securing Electronic Mail Systems, MILCOM 92* (San Diego, CA 1992) pp. 29.1.1–29.1.4.

Shamir, A., *How to Share a Secret,* Comm. ACM v. 22, n. 11 (Nov. 1979) pp. 612–613.

Simmons, J., *An Impersonation–Proof Identity Verification Scheme,* Advances in Cryptology—CRYPTO '87, pp. 211–215.

Simmons, J., *Zero–Knowledge Proofs of Identity and Veracity of Transaction Receipts,* Advances in Cryptology—EUROCRYPT 188, pp. 35–49.

Simmons, *A Protocol to Provide Verifiable Proof of Identity and Unforgeable Transaction Receipts,* IEEE Journal on Selected Areas in Communications, vol. 7, No. 4, May 1989, pp. 435–447.

Sirbu, et al., *NetBill: An Internet Commerce System Optimized for Network Delivered Services,* Engineering and Public Policy Department, Computer Science Department, Carnegie Mellon. University, Pittsburgh, Pennsylvania 15213, pp. 1–11.

Snare, J.L., *Secure Electronic Data Interchange,* Computer Security in the Age of Information, (W.L. Caelli, ed.), IFIP, 1989, pp. 331–342, (1989).

Sollins, K.R., *Cascaded Authentication,* IEEE Symposium on Security and Privacy (Apr. 18–21, 1988), pp. 156–163.

Stadler et al, *Fair Blind Signatures,* Advances in Cryptology—EUROCRYPT '95 (1995).

Stein et al., *The Green Commerce Model,* pp. 1–17, (Oct. 1994).

Tsudik, G., *Zurich iKP Prototype (ZiP), Protocol Specification Document,* IBM Zurich Research, pp. i–27 (Mar. 5, 1996).

Varadharajan et al., *Formal Specification of A Secure Distributed Messaging System,* 12th National Computer Security Conference Proceedings, pp. 146–171, (Oct. 1991).

Varadharajan, V., Notification: *A Practical Security Problem in Distributed Systems,* 14th National Computer Security Conference, pp. 386–396, (Oct. 1991).

Waidner, M., *Development of a Secure Electronic Marketplace for Europe,* Proc. of ESORICS 96, Rome, (Seq. 1996), pp. 1–15.

Zhou et al., A Fair Non–Repudiation Protocol, IEEE (1996), pp. 55–61.

SIMULTANEOUS ELECTRONIC TRANSACTIONS WITH VISIBLE TRUSTED PARTIES

RELATED APPLICATION

This application is a continuation of Ser. No. 08/700,270, filed Aug. 20, 1996, now U.S. Pat. No. 5,629,982, which is a a continuation of application Ser. No. 08/511,518 filed on Aug. 4, 1995 now U.S. Pat. No. 5,553,145, which is a continuation-in-part of prior application Ser. No. 08/408,551, filed Mar. 21, 1995 now abandoned.

TECHNICAL FIELD

The present invention relates generally to electronic commerce and transactions and more particularly to techniques for enabling users to effect certified mail, contract signing and other electronic notarization functions.

BACKGROUND OF THE INVENTION

The value of many transactions depends crucially on their simultaneity. Indeed, simultaneity may be so important to certain financial transactions that entities often are willing to incur great inconvenience and expense to achieve it. For example, consider the situation where two parties have negotiated an important contract that they now intend to "close." Often, the parties find it necessary to sign the document simultaneously, and thus they meet in the same place to watch each other's actions. Another example is the process of certified mail, where ideally the sender of a message desires that the recipient get the message simultaneously with the sender's obtaining a "receipt". A common certified mail procedure requires a person who delivers the mail to personally reach the recipient and obtain a signed acknowledgment when the message is delivered. This acknowledgment is then shipped to the sender. Again, this practice is costly and time consuming. Moreover, such acknowledgments do not indicate the content of the message.

In recent years, the cost, efficiency and convenience of many transactions have been improved tremendously by the availability of electronic networks, such as computer, telephone, fax, broadcasting and others. Yet more recently, digital signatures and public-key encryption have added much needed security to these electronic networks, making such communication channels particularly suitable for financial transactions. Nevertheless, while electronic communications provide speed, they do not address simultaneity.

The absence of simultaneity from electronic transactions severally limits electronic commerce. In particular, heretofore there has been no effective way of building so-called simultaneous electronic transactions ("SET's"). As used herein, a SET is an electronic transaction that is simultaneous at least in a "logically equivalent" way, namely it is guaranteed that certain actions will take place if and only if certain other actions take place. One desirable SET would be certified mail, however, the prior art has not addressed this problem effectively. This can be seen by the following consideration of a hypothetical example, called ideal certified mail or "ICM". In an ICM transaction, there is a sender, Alice, who wishes to deliver a given message to an intended recipient, Bob. This delivery should satisfy three main properties. First, Bob cannot refuse to receive the message. Second Alice gets a receipt for the message if and only if Bob gets the message. Third, Alice's receipt should not be "generic," but closely related to the message itself. Simultaneity is important in this transaction. For instance, Alice's message could be an electronic payment to Bob, and it is desired that she obtains a simultaneous receipt if possible.

Alice could try to get a receipt from Bob of a message m in the following way. Clearly, sending m to Bob in the clear as her first communication does not work. Should this message be her digital signature of an electronic payment, a malicious Bob may lose any interest in continuing the conversation so as to deprive Alice of her receipt. On the other hand, asking Bob to send first a "blind" receipt may not be acceptable to him.

Another alternative is that Alice first sends Bob an encryption of m. Second, Bob sends Alice his digital signature of this ciphertext as an "intermediate" receipt. Third, Alice sends him the decryption key. Fourth, Bob sends Alice a receipt for this key. Unfortunately, even this transaction is not secure, because Bob, after learning the message when receiving Alice's key, may refuse to send her any receipt. (On the other hand, one cannot consider Bob's signature of the encrypted message as a valid receipt, because Alice may never send him the decryption key.)

These problems do not disappear by simply adding a few more rounds of communication, typically consisting of "acknowledgments". Usually, such additional rounds make it more difficult to see where the lack of simultaneity lies, but they do not solve the problems.

Various cryptographic approaches exist in the literature that attempt to solve similar problems, but they are not satisfactory in many respects. Some of these methods applicable to multi-party scenarios propose use of verifiable secret sharing (see, for example, Chor et al), or multi-party protocols (as envisioned by Goldreich et al) for making simultaneous some specific transactions between parties. Unfortunately, these methods require a plurality of parties, the majority of which are honest. Thus, they do not envision simultaneous transactions involving only two parties. Indeed, if the majority of two parties are honest then both parties are honest, and thus simultaneity would not be a problem. Moreover, even in a multi-party situation, the complexity of these prior art methods and their amount and type of communication (typically, they use several rounds of broadcasting), make them generally impractical.

Sophisticated cryptographic transactions between just two parties have been developed but these also are not simultaneous. Indeed, if just two people send each other strings back and forth, and each one of them expects to compute his own result from this conversation, the first to obtain the desired result may stop all communications, thereby depriving the other of his or her result. Nonetheless, attempts at providing simultaneity for two-party transactions have been made, but by using assumptions or methods that are unsatisfactory in various ways.

For example, Blum describes transactions that include contract signing and certified mail and that relies on the two parties having roughly equal computing power or knowledge of algorithms. These assumptions, however, do not always hold and are hard to check or enforce anyway. In addition, others have discovered ways to attack this rather complex method. A similar approach to simultaneity has also been proposed by Even Goldreich and Lempel. In another Blum method for achieving simultaneous certified mail, Alice does not know whether she got a valid receipt. She must go to court to determine this, and this is undesirable as well.

A method of Luby et al allows two parties to exchange the decryption of two given ciphertexts in a special way, namely, for both parties the probability that one has to guess correctly the cleartext of the other is slowly increased towards 100%. This method, however, does not enable the parties to achieve guaranteed simultaneity if one party learns the cleartext of the other's ciphertext with absolute certainty (e.g., by obtaining the decryption key); then he can deny the other a similar success.

For this reasons several researchers have tried to make simultaneous two-party transactions via the help of one or more external entities, often referred to as "centers", "servers" or "trustees", a notion that appears in a variety of cryptographic contexts (see, for instance, Needham and Schroder and Shamir). A method for simultaneous contract signing and other transactions involving one trustee (called a "judge") has been proposed by Ben-Or et al. Their method relies on an external entity only if one party acts dishonestly, but it does not provide guaranteed simultaneity. In that technique, an honest party is not guaranteed to have a signed contract, even with the help of the external entity. Ben-Or et al only guarantee that the probability that one party gets a signed contract while the other does not is small. The smaller this probability, the more the parties must exchange messages back and forth. In still another method, Rabin envisions transactions with the help of external party that is active at all times (even when no transaction is going on), but also this method does not provide guaranteed simultaneity.

The prior art also suggests abstractly that if one could construct a true simultaneous transaction (e.g., extended certified mail), then the solution thereto might also be useful for constructing other types of electronic transactions (e.g., contract signing). As noted above, however, the art lacks an adequate teaching of how to construct an adequate simultaneous transaction.

There has thus been a long-felt need in the art to overcome these and other problems associated with electronic transactions.

BRIEF SUMMARY OF THE INVENTION

It is an object of the invention to provide true simultaneous electronic transactions.

It is a further object of the invention to provide electronic transactions having guaranteed simultaneity in a two-party scenario with the assistance of a visible trusted party.

It is another more specific object of the invention to provide ideal certified mail wherein the identity of the sender is temporarily withheld from the recipient during the transaction.

It is still another object of the invention to provide a simultaneous electronic transaction wherein the recipient can prove the content of a message and a receipt provided to the sender proves the content of the message.

These and other objects are provided in an electronic communications method between a first and a second party, with assistance from at least a trusted party, enabling an electronic transaction in which the first party has a message for the second party. A first method, called the sending receipt approach, begins by having the first party transmit to the trusted party a custom version of the message intelligible to the second party but not by the trusted party. In response, the method continues having the trusted party verify that the first party transmitted the custom version of the message and that the second party is the intended recipient thereof. The trusted party then transmits to the second party information from which the second party can retrieve the message. Then, the trusted party transmits to the first party a sending receipt indicating that the message has been transmitted to the second party. At least one of the transmissions is carried out electronically.

According to an alternative embodiment, called the return receipt approach, the method begins having the first party transmit to the trusted party a custom version of the message intelligible to the second party but not by the trusted party. In response, the method continues by having the trusted party verify that the first party transmitted the custom version of the message and that the second party is the intended recipient thereof. The trusted party then transmit to the second party first information which determines the message but retains the message and the identity of the first party hidden from the second party. A test is then done to determine whether within a given time the second party transmits to the trusted party a return receipt indicating that the second party received the transmission of the first information from the trusted party. If the second party transmits the return receipt to the trusted party, the method has the trusted party (i) transmit to the second party second information from which the second party, using the first and second information, can retrieve the. message, and (ii) transmit to the first party a receipt that the second party has received the message. Again, at least one of the transmissions is carried out electronically.

Many other electronic communications methods are described wherein the first party, the second party and the trusted party undertake an exchange of transmissions, at least one of which occurs electronically and in an encrypted manner, such that if all transmissions reach their destinations the second party only receives the message if the first party receives at least one receipt. At least one receipt received by the first party enables the first party to prove the content of the message received by the second party.

BRIEF DESCRIPTION OF THE DRAWINGS

For a more complete understanding of the present invention and the advantages thereof, reference should be made to the following Detailed Description in conjunction with the accompanying drawings in which.

DETAILED DESCRIPTION

Figure 1:
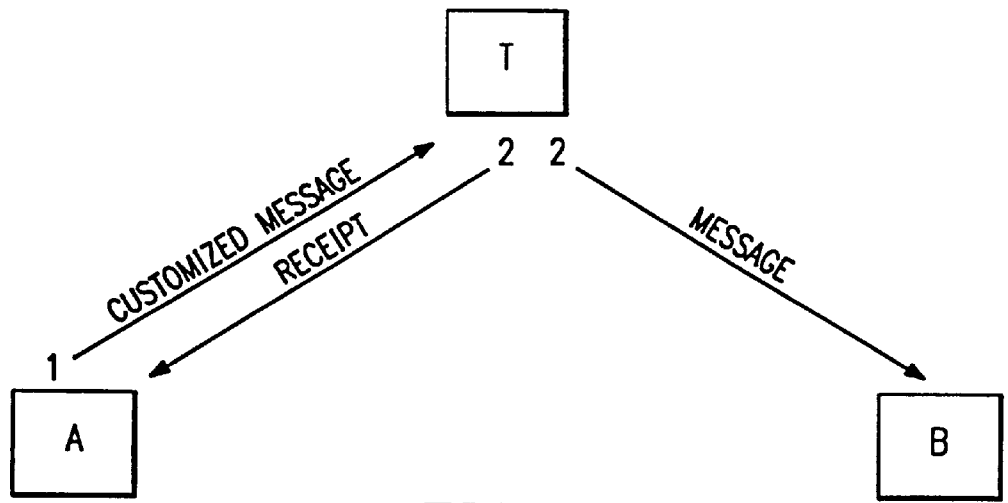
FIG. 1 illustrates a preferred sending receipt method of the invention.
Figure 2:
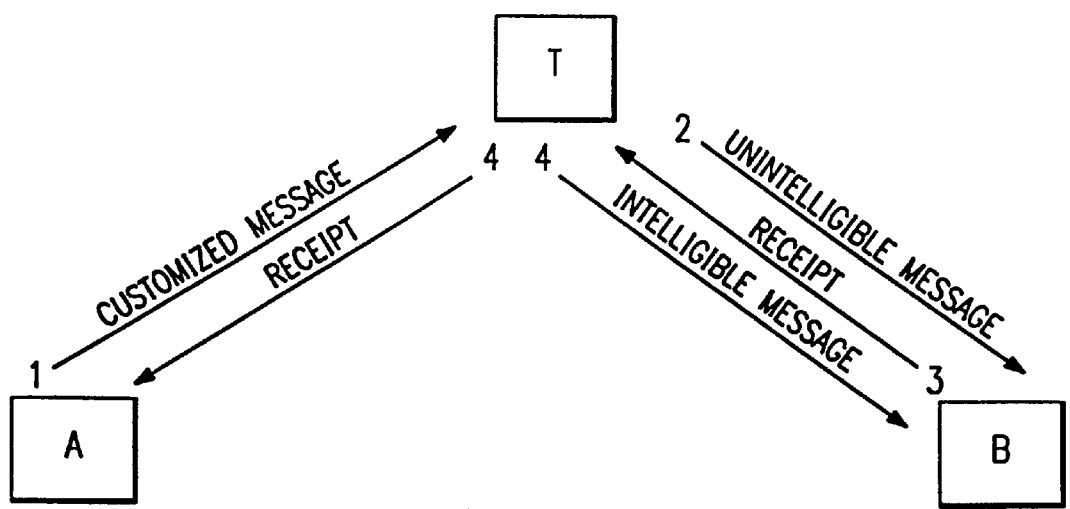
FIG. 2 illustrates a preferred return receipt method of the invention.

In each of the schemes described below, there is a user Alice and a user Bob. The trusted party may be a financial center that facilitates SETs among its customers, including Alice and Bob. For convenience, the following description shows how to make extended certified mail "simultaneous", although the invention is not so limited. In the context of an ICM system, the third party is called the Post Office. The inventive scheme is also preferable to ordinary certified mail because the message receipt also guarantees the content of the message. Also, the electronic transaction is faster, more informative and more convenient than traditional certified mail, and its cost should be substantially lower.

In the preferred embodiment, an extended certified mail system is provided using a single "trusted" party. The system is implemented in a computer network, although it should be realized that telephone, fax, broadcast or other communication networks may be used. Thus, without limitation, it is assumed that each user in the system has a computer capable of sending and receiving messages to and from other computers via proper communication channels.

Each user in the system has a unique identifier. Alice's identifier is denoted by A, and Bob's identifier is B. The identifier of the Post Office is denoted by PO. Users and the Post Office can digitally sign messages. Thus, each has a secret signing key and a matching public verification key. If m is a message (string), then $SIG_A(m)$ indicates Alice's signature of m. (It is assumed, for convenience, that m is always retrievable from its signature. This is the case for most signature schemes, and it is otherwise possible to consider a signed message as the pair consisting of the message and its signature.)

Users and the Post Office can encrypt messages by means of a public-key encryption algorithm (e.g., RSA). Thus, each has a public encryption key and a corresponding secret decryption key. $E_A(m)$, $E_B(m)$, and $E_{PO}(m)$ denote, respectively, the encryption of a message m with the public key of Alice, Bob, and the Post Office. For simplicity, it is assumed that these schemes are secure in the sense that each of EA', EB' and $E_{PO}$ appear to behave as a random function. The system can be suitably modified if these functions are much less secure.

Again, for simplicity these encryption algorithms are deterministic and uniquely decodable. Thus, given a value y and a message m, all can verify whether y is the encryption of m with, for example, the Post Office's key, by checking whether $E_{PO}(m)$ equals y. (If the encryption scheme is probabilistic, then one may convince another that a string y is an encryption of a message m by providing m together with the random bits that were used to encrypt m.) (It may also be possible to use encryption algorithms that are not uniquely decodable, for instance, if it is hard to decrypt a given ciphertext in two different ways.) For simplicity, if public key encryption algorithms are used, messages are encrypted directly with a public-key algorithm, however, one could first encrypt a message conventionally with some key k, and then encrypt k with a public-key algorithm. (Thus, to decrypt m, one need only just decrypt k). Indeed, private key encryption algorithms could be used throughout.

According to the invention, it is desired to devise practical [CM methods, involving more visible trustees, that (1) produce receipts closely tied to the content of the mail, (2) hide (at least temporarily) the identity of senders from the recipients, and (3) can be implemented in a pure electronic manner (at least, as long as senders and recipients behave properly).

THE SENDING-RECEIPT METHOD

To describe the various methods of the present invention, assume there are senders, receivers and post offices. It should be clear, however, that each of these may be any entity, such as a person, a person's representative, a physical device (in particular, a tamper-proof device) or a collection of people and/or physical devices. For example, the Post Office could be a tamper-proof device located in a device or facility belonging to Alice and/or Bob.

Also, in the preferred embodiments, Alice, Bob and the Post Office all have public encryption keys and matching secret decryption keys (e.g. like in the RSA algorithm), that their cryptosystem behave like random functions, and that they can digitally sign messages (preferably by an algorithm different than their encryption one). An encryption of a string s with the public key of Alice, Bob, and the Post Office will be denoted, respectively, as $E_A(s)$, $E_B(s)$, $E_{PO}(s)$. The digital signature of a string s by Alice, Bob, and the Post Office will, respectively, be denoted by $SIG_A(s)$ $SIG_B(s)$, and $SIG_{PO}(s)$. (it is understood that messages can be one-way hashed prior to being signed, together with other valuable information, such as recipient, time, transaction type, sender and recipient, etc.) Identifiers for Alice, Bob, and the Post Office will, respectively, be denoted by A, B, and PO.

In the present invention, a customization step is used by Alice to identify (usually to the Post Office) herself as the sender and Bob the (ultimate) recipient of some string s (usually a message m encrypted with Bob's public encryption key). This step prevents cheating. In particular, it prevents an enemy from sending to Bob the same message Alice does and in a certified manner. Any customization step is in the scope of the present invention. A simple such step consists of having Alice send the Post Office a value $z=E_{PO}(A, B, E_B(m))$. Indeed, should the Post Office receive from some user X other than Alice the value z, upon decrypting it with its secret decryption key, it will compute $(A, B, E_B(m))$ and thus realize that there is a problem with the identity of the sender.

The above customization works well if the encryption function behaves as a random function. Alternative and more sophisticated customizations, all within the scope of the invention, are also possible. For instance, Alice may send the Post Office $z=E_{PO}(SIG_A(ICM, B, E_B(m)))$, where the identifier ICM signifies that z is part of an electronic certified mail transaction. Such identifiers may be dismissed, particularly if standard formats are adopted for ICM transactions. As another example, Alice may achieve customization by using identifiers and her digital signature both outside and inside the Post Office's encryption layer: $z=SIG_A(A, B, E_{PO}(SIG_A(A, B, E_B(m))))$. In some contexts (e.g., but without limitation, when the communications channel is believed to be secure), it may suffice to use a customization where the identity of the sender and the message are sent separately, whether or not signed together (e.g., $(B, E_B(m))$ or $SIG_A(B, E_B(m))$).

The basic electronic certified mail system with a visible party is now described. At least one transmission in the method below (and preferably all) are electronic, where by "electronic" we mean any non-physical delivery, including, without limitation, transmissions via telephones, computer networks, radio, broadcasting, air waves, and the like.

THE BASIC METHOD

A1 Sender Step): Let m be the message that Alice desires to send Bob by certified mail. Then Alice sends to the Post Office a customized version of m that is intelligible by Bob, but not by the Post Office.

(e.g., she sends the value $z=E_{PO}(A, B, E_B(m))$.

Preferably, Alice's communication is digitally signed and indicates, in a standard manner, that it should be delivered certified to Bob. (e.g., using an alternative customization step, just for illustration purposes, she sends $z=E_{PO}(SIG_A(ICM, B, E_B(m)))$, or $E_{PO}(SIG_A(B, E_B(m)))$.) It is also preferable that Alice specifies additional valuable information, such as time information and information easily alerting the Post Office that her transmission is part of an ICM transaction.

PO1 (Post Office Step): After receiving Alice's transmission, the Post Office preferably uses the customization step to verify that Alice is the sender and Bob the intended recipient of this piece of electronic certified mail. If this is the case, then it sends to Bob information enabling him to retrieve Alice's message, preferably using digital signatures, and indicating to him but hiding from others that it is a piece of ICM from Alice to him, (e.g., it sends $y=E_B(SIG_{PO}(ICM, A, B, E_B(m)))$, or ICM, y, so that Bob it is more easily alerted that he is dealing with an ICM transaction).

If Alice has made use of digital signatures (e.g., if she has signed $E_B(m)$ or a value comprising it in Step AI, then it is preferable that these signatures are also forwarded to Bob. (e.g., if Alice sent the Post Office the value $SIG_A(EB(m))$ as part of her Step AI, then the Post Office may send $E_B(SIG_{PO}(ICM, A, B, SIG_A(E_B(m))))$ to Bob in this step.)

In addition, the Post Office also sends Alice her receipt. Preferably this involves a digital signature that it has sent Alice a message to Bob in a way intelligible to him. Such a receipt preferably also indicates other valuable information, such as the time, T, when this was done. (e.g., it sends Alice $E_A(SIG_{PO}(ICM, A, B, T E_B(m)))$.)

The Post Office of the Sending-Receipt Method is visible because it takes part to the transaction whether or not Alice and Bob behave honestly. It should be understood that each party to the transaction (whether the Sending Receipt method or the Return Receipt method or other methods of the invention) may participate in the transaction via a representative. In such case, for instance, Alice may be identified with a representative. Alternatively, it should be understood that a party may only be partially-identified with his own representative. For instance, the message may be sent to Bob's representative but be intelligible only to Bob himself.

The Post Office is not trusted with the knowledge of Alice's (cleartext) message to Bob; indeed, it cannot understand m. It is trusted, instead, to perform a proper delivery, which makes the Sending-Receipt Method a (logically) simultaneous transaction; indeed, Alice gets Bob's receipt if and only if Bob gets information from which he can retrieve Alice's message. The simultaneity of the transaction is not affected by the order in which the Post Office sends the encrypted message to Bob and the receipt to Alice. What matters is that it sends both of them or none, or that functionally equivalent steps are taken to preserve simultaneity.

Alice's receipt certifies that her message was properly sent to Bob, but not the fact that Bob actually received it. The Post Office is indeed trusted with properly sending messages and this can be construed to include that these messages sent by the Post Office reach their destinations. But receiving a piece of mail (i.e. having a letter deposited in the right mailbox or having an electronic message reach the right computer) may not mean that the recipient is aware of the delivery. It is this awareness that is necessary in many scenarios, such as many legal applications. This is why the present method is called a sending-receipt method. The method thus is the electronic equivalent of traditional certified mail, without return receipt.

The electronic nature of the method, however, requires some special care, such as a proper customization step. Indeed, in traditional electronic mail, it is easy to achieve that an enemy cannot send to Bob the same message Alice does, because, if he does not know this message a priori, he is prevented from copying by the envelope containing it. $E_B(m)$, however, is a kind of envelope that prevents understanding m, but can be copied. Indeed, if Alice sends $E_B(m)$ to Bob without customization and an enemy intercepts her transmission, he may easily send the same ciphertext $E_B(m)$ to Bob (by certified mail or not), creating various potential problems. This has been a recognized problem in cryptography in different contexts. Notice that having Alice just sign $E_B(m)$) does not solve the problem. Indeed, an enemy X who captures $SIG_A E_B(m))$, easily learns the value $E_B(m)$ (because signatures generally guarantee the message, but do not hide it), and can then easily sign it himself, that, send ($SIG_X E_B(m)$) as part of his own ICM transaction.

In the present invention, encryption of the message m with a key associated to a party X, $E_X(m)$, should be broadly construed to include any information that enables X (and only X) to retrieve the message m. For instance, $E_X(m)$ may consist of the encryption with a key associated with X of another key with which the message m has already been encrypted. (This other encryption of m may already be in possession of X, or sent separately to X, or publicly-known, or otherwise knowable by X).

The electronic sending-receipt method is more than equivalent to traditional certified mail (without return receipt). Indeed, if digital signatures are properly used as exemplified above, not only does Bob learn (and can prove) Alice's identity and get Alice's message, he can also prove to third parties what this message is. For instance, if the Post Office (in Step PO1), sends him the value $v=(SIG_{PO}(E_B(A, B, E_B(m)))$, if Bob hands out v and m to a third party, the latter can compute $u=E_B(m)$ by means of Bob's public encryption key, and then (again due to Bob's public encryption key) the value $s=E_B(A, B, u)$, and, finally he can verify whether v is the Post Office's digital signature of s. If the Post Office is trusted with respect to deliver just what it is supposed to, then this is sufficient proof that Bob got m from Alice via ICM. Indeed, Alice's message can be defined to be whatever string x can, when encrypted with Bob's key, yields the value $E_B(m)$. If such x is nonsensical, then Alice sent Bob a nonsensical message. This convention prevents Bob from claiming that he did not really get Alice's message in this way.

Should one prefer to trust the Post Office even less, and still enable Bob to prove which message he got from Alice, it suffices, for instance, that Alice makes use of digital signatures; e.g., she sends $z=E_{PO}(SIG_A(ICM, B, E_B(m)))$ in Step A1, and the Post Office sends $SIG_A(ICM, B, E_B(m))$ preferably further signed and encrypted—to Bob in Step PO1. This way, by revealing m, Bob can prove via Alice's signature that she indeed sent him m by extended certified mail.

The electronic sending-receipt method is superior to traditional certified mail in another respect. Alice's receipt needs not to be a generic one, but enables her to prove the exact content of the message she sent Bob. In fact, if her receipt consists of the Post Office's digital signature that it has sent $z=E_{PO}(A, B, E_B(m))$ to Bob, by revealing m she enables anyone to compute $v=E_B(m)$ from Bob's public encryption key, and thus $E_{PO}(A, B, v)$ from the Post Office's public encryption key, so as to verify that the result is indeed z, the value signed by the Post Office.

The ICM is superior to other electronic methods for certified mail in many respects. In particular, simultaneity is guaranteed, rather than being just highly probable. Moreover, since the Post Office provides Alice with her receipt, Bob cannot decide whether or not to accept a message from her based on the sender's identity.

It is recommended that each transmission occur within the encryption layer of its immediate recipient. (e.g., in Step A1, it is preferable that Alice sends $E_{PO}(SIG_A(ICM, B, E_B(m)))$ rather than $SIG_A(ICM, B, E_B(m))$.) Among other things, this way of transmitting denies an enemy monitoring such transmissions valuable information, such as sender-receiver information. That is, if an enemy learns $E_B(SIG_{PO}(ICM, B, E_B(m)))$, the transmission of the Post Office to Bob of Step PO1, and it further knows that this value was travelling from the Post Office to Bob, it may deduce that Bob is the recipient of a piece of certified mail, but it may not easily learn that the sender was Alice because this piece of data is protected under Bob's encryption key. Indeed, the Post Office may make this harder by processing its PO1 steps relative to different senders and recipients in a different order. If at every time interval there are sufficiently many senders, this will confuse the enemy even more. In addition, the Post Office may arrange for dummy transmissions, so as to have sender traffic that always looks reasonably busy. This enables it to process real and fake sending request in an interwoven order without creating any delays. If desired, however, most recipient-encryption protections could be dispensed with.

Finally, the reference to m as the message Alice wants to send to Bob should be broadly construed to mean any message that Alice has for Bob, including a message that is chosen before the transaction, but arises or is implicitly defined by the transaction.

VARIANTS AND IMPROVEMENTS. Many variants of the above and following methods are applicable and within the scope of the invention. In particular, customization may be dismissed all together or achieved by means of other electronically transmissible methods. The sender's identity may be used for customization purposes, but hidden from the recipient in some applications. Alice's message may not be hidden from the Post Office. (e.g., if this is a machine, or consists of a collection of individuals, many of which must cooperate to learn the message). Also, digital signatures should be broadly construed to include any form of electronically transmissible guarantees. Conventional encryptions may be used in alternative or in conjunction with public-key one. A higher level of interaction may be adopted in our methods (e.g., if one wishes to get additional valuable benefits, such as zero-knowledge). In particular, each of our Steps can be realized by means of more rounds of communications. Time information may be included in some or all of the transmissions, each party may be a multiplicity of parties, and so on.

Proper use of time information may be important. For instance, assume Alice specifies (preferably in an untamperable way) to the Post Office the time in which her string was sent. If the Post Office receives it too late (or too early), it may not send any communication to Bob nor any receipt to Alice. (Indeed, if the certified message from Alice to Bob is an order to buy stock that day, Bob may not be responsible for failing to obey the order if he got it unreasonably late.) Alternatively, the Post Office may specify in its communication to Bob the time when this was sent, preferably in a digitally signed manner, so that, among other things, Bob may in many contexts prove that he got Alice's message too late. The Post Office may also deny Alice her receipt if her AI transmission arrives too late, or it may issue her a properly "time-stamped" receipt, but such receipt may be deemed void for certain purposes if some of the time information indicated is deemed to be too late.

Multiplicities of parties may also be quite useful. For instance, Alice may deal with two or more Post Offices for delivering the same message to Bob. In this case, having two independent receipts for the same message constitutes a much greater evidence that at least one of the Post Offices has properly sent the message to Bob.

Alternatively, Alice may conveniently deal with a single Post Office, but this is an entity comprising or coordinating several agents. Such an entity may give Alice's communication to two or more of its agents, and these will send Alice's message to Bob in the proper manner, generating the proper receipts. These receipts may then be given by the agents to Alice directly, or to the (or some other) entity, who then will give them (or sufficiently many of them, or a consolidated version of some of them) to Alice.

It is also useful that the Post Office agents possess pieces of a secret key of the Post Office. In this case one may wish that they collaborate for decrypting some communications sent to the Post Office in an encrypted manner. If some of these communications are intended for someone else (e.g., if one such communication consists of or includes $E_B(m)$ encrypted with the Post Office' key), then the Post Offices agents may enable directly the recipient to decrypt the communication (e.g., they may enable only Bob to reconstruct $E_B(m)$. This may be achieved, for instance, by a proper use of threshold cryptosystems. Indeed, if single agents are incapable of understanding messages encrypted with the Post Office's key, it may be unnecessary for Alice to first encrypt her message m to Bob with Bob's key. She may directly encrypt m with such a multi-party controlled key of the Post Office, the agents of the Post Office will then enable Bob to decrypt m, while the agents and/or the Post Office will give Alice a proper receipt. A single or sufficiently few agents of the Post Office will not, however, be able to understand m.

Another improvement is the following. In the Sending-Receipt Method Bob may claim that he did not "really" receive Alice's message because he lost his decryption key. To solve this problem, the Post Office may perform the Return Mail Service only for those users who guarantee to back up their secret decryption keys in a deemed acceptable way; so that, for instance, such a Bob may not use his having lost his secret key as a defense against an unwanted piece of certified mail. For example, to be eligible to receive a piece of ICM, it can be required that Bob performs (or that he has have already performed) a given key-escrow procedure relative to his keys used for electronic certified mail purposes. This way, Bob may always be capable of retrieving his secret key.

To create further incentive for Bob to undergo this key-escrow step, it may be stipulated that a user cannot be a sender of an ICM system, unless he also is a potential receiver with a properly backed up key. In any case, the Post Office (or a court if and when it is invoked) may regard Bob as a legitimate receiver if he had given a suitable and timely indication that he accepts a given key of his to be used for ICM purposes.

Alternatively, Bob may be regarded to be a legitimate recipient of a piece of ICM by the mere fact that a key of his is known to be suitably backed up (e.g., by an approved key-escrow method), and it was this key of his to be used as the recipient-key in a ICM transaction. The fact that Bob has elected a key of his to be usable as a recipient-key for ICM purposes, of the fact that a key of his is suitably backed up, may, for instance, be part of a certificate of this key (e.g., of the certificate showing that this key belongs to Bob). Alternatively, Bob may coincide for ICM purposes with a plurality of entities each having a piece of "his" decryption key, so that sufficiently many of these entities may recovery any message encrypted with Bob's encryption key. Thus, the Post Office may communicate with each or sufficiently-many of these entities.

Alternatively, if, as described above, the Post Office has several agents so as to offer a service based on a type of threshold cryptosystem and messages are not further encrypted with a recipient key, there is no worry that the recipient may lose his key. Indeed, it will be the Post Office who will enable him to get his message from Alice. Notice also that a weaker customization of Alice's message to Bob may be realized within Bob's encryption layer, or even solely within this layer.

For instance, Alice may send to the Post Office $z=E_{PO}(w)$, where $w-E_B(A, B, m)$ or $(w=E_B(SIG_A(m)))$, just to give an example of an alternative customization in this setting. In this setting, the message received by Bob is conventionally declared to be m only if w is an encryption of (A, B, m), that is, if it identifies in some standard way Alice as the sender and Bob as the recipient. For instance, if Bob is a stockbroker and m a purchaser order of a given stock, if v does not consist of A, B, m, Bob is not obliged to buy that stock. This way of proceeding facilitates the job of the Post Office (for instance because it may not be asked to check any customization) and still offers valuable protection.

The Return-Receipt Method

Despite its utility, the Sending-Receipt Method suffers from the following problem: Bob may never receive (or claim not to have received) Alice's (cleartext) message, not because he lost (or claims to have lost) his decryption key, but because he never got (or claims to have not gotten) any communication from the Post Office. For instance, if a computer network is used for communicating during an ICM transaction, a failure may occur or may claimed to have occurred.

To solve such problems, the Sending-Receipt Method is augmented as follows. After receiving the communication of Step PO1, Bob may be asked or required to send a proper receipt back. This receipt may be sent to the Post Office (or directly to Alice, since at that point Bob may have already learned Alice's identity). Such receipt, if obtained, simplifies matters a great deal, and offers much greater guarantees to everyone involved. Upon receiving it, the Post Office may store it, or send it to Alice as an additional receipt, or issue to Alice an equivalent additional receipt.

Alternatively, the Post Office may withhold Alice's receipt of Step PO1, and give it to her only if Bob does not produce any receipt for the Post Office's PO1 transmission to him. Moreover, if Bob does not produce a receipt, the Post Office may take some of the actions described below that enable it to obtain a receipt from Bob in some other manner or enable it to produce a suitable affidavit (e.g., that Bob willingly refused Alice's message). It is expected that Bob will readily acknowledge the Post Office PO1 transmission most of the times. Indeed ' he knows that Alice gets a sending receipt anyway, and that the Post Office will obtain a receipt from him (or issue a suitable affidavit) anyway.

Moreover, it can be arranged that eligible recipients in the ICM systems can incur additional charges if alternative actions to obtain a receipt from them are taken.

In the method just described, Bob is required to produce a receipt after he learns Alice's message, and her identifier if so wanted. The return-receipt method below, instead, elicits a receipt from Bob before he knows the message or the sender's identity. Nonetheless, the new receipt may still be used, if desired, to prove to third parties the content of Alice's message. In describing the preferred embodiment of the new return-receipt method, the same computational framework of the Sending-Receipt Method is assumed. In fact, the first step is identical to that of the Sending-Receipt Method.

THE RETURN-RECEIPT METHOD

A1 (Sender Step): Let m be the message that Alice wishes to send to Bob in a certified manner. Then she sends the Post Office an encrypted version of m intelligible by Bob but not by the Post Office.

Her transmission is preferably customized, signed, and indicates that it is part of an ICM transaction together with other valuable information, such as the transmission time. (e.g., she send $z=E_{PO}(SIG_A(ICM, B, T, E_B(m)))$.) PO1 (Post Office Step): The Post Office verifies who is the sender and who is the intended recipient, and It sends Bob information that determines his message without making it yet intelligible to him.

In so doing the Post Office preferably hides Alice's identify, alerts Bob that he is dealing with an ICM transaction, and makes use of digital signatures. (e.g., it sends Bob $y=E_{PO}(SIG_{PO}(ICM, recipient: B, z))$ or ICM, $SIG_{PO}(E_B(B, z)))$.

It also sends Alice a guarantee that it has done so.

Preferably, in so doing it also specifies other valuable information, such as time information T. (e.g., it sends Alice the value $x=E_A(SIG_{PO}(z, T))$.)

B1 (Recipient Step): Bob sends the Post Office a receipt that he got the above transmission. (e.g., he sends $E_{PO}(w)$, where $w=SIG_B(recipient, z)$).

Possibly, Bob's receipt also indicates other valuable information.

PO2 (Post Office Step): If Bob sends back the proper receipt within a specified amount of time, then the Post Office 1. sends Alice a suitable receipt; for instance, EA (w), and
2. sends Bob information that enables him to reconstruct Alice's message (e.g., $E_B(m)$).

If Alice has signed her transmission to the Post Office in Step A1 (e.g., she has sent the value z envisaged above), then it is preferable that the Post Office also enables Bob to guarantee the content of the message (e.g., it send Bob $SIG_A(ICM, B, T, E_B(m))$).

If Bob does not send back the proper receipt to the Post Office within a given amount of time, then the Post Office may either do nothing (in which case the only form of receipt in Alice's possession is what she has received from the Post Office in Step PO1); or inform Alice that it has received no receipt from Bob; or make a record that no receipt has been sent by Bob; or PO3 takes action to deliver Alice's message to Bob in a way that is guaranteed to produce a return-receipt (e.g., it delivers the message to Bob by means of traditional certified mail). The thus obtained return receipt (or an affidavit that Bob refused willingly the mail) is then sent to Alice.

The above ICM transaction is a (logically) simultaneous one, and one that hides the identity of sender for as long as necessary.

The same variants and modifications for the Sending-Receipt Method can also be applied to the above method. Other variants may also be applied. In particular, the sending-receipt given by the Post Office to Alice in step PO1 may never be sent (e.g., because it may become irrelevant once Alice gets a return-receipt), or sent only if Bob does not produce a return-receipt fast enough. Also, the Post Office may receive a transmission from Alice before it performs its PO2 step. For instance, if Alice sends $E_A E_B(m)$ in Step A1, she is required to remove her encryption layer before Step PO).

If Bob receives the value z sent to him by the Post Office and properly acknowledges it (i.e., if all involved—including the. communication network—behave properly), the Return-Receipt Method is most efficient, convenient and economical, since, in particular, it can be implemented in a pure electronic manner. In the Return-Receipt Method, Bob has even more incentives to produce his receipt than in the above modification of the Sending-Receipt Method. Indeed, for instance, while Alice may get a proper sending-receipt anyway that can prove the content of her message to him, if Bob refused to issue his better receipt, he will not even read the cleartext message, nor learn the sender's identity. Thus, while Alice already has a good form of receipt, by refusing to collaborate he has absolute nothing!

Despite the fact that Bob will almost always produce his receipts, the following are some practical ways to implement Step PO3. Here, the Post Office aims at delivering m to Bob in exchange for a receipt. Because the Post Office will not in general know m, it suffices that it delivers $E_B(m)$, or a string encompassing it. Without intending any restrictions, assume that the Post Office aims in Step PO3 at delivering the value $z=E_{PO}(SIG_{PO}(ICM, A, B, T, E_B(m)))$, envisaged in Step A1 and sent in digital form via a computer network.

To begin with, as discussed the delivery of z may occur by some version of traditional certified mail. For instance, the Post Office may print z on paper and then traditionally certified-mail deliver it to Bob, via a "mailman" which may or may not work for the Post Office (e.g., he may belong to UPS, Federal Express or other agency). The return-receipt obtained this way does not guarantee the content of the message, however, it may guarantee it in an indirect, yet adequate, way. For instance, it can be used in conjunction with a proper receipt of the Post Office (e.g., a digital signature of z sent to Alice in Step PO1) to provide evidence of the message actually delivered to Bob.

This format of z may be inconvenient, and thus create an extra incentive for Bob to issue a receipt in Step B1. Nonetheless, even this format of z may enable Bob to recover m: for instance, he may scan it (with character recognition) and then to put it into digital form prior to decrypting.

More conveniently, the Post Office may store z in a computer diskette and have it delivered in person to Bob. This form of delivery enables Bob to produce a return-receipt that guarantees directly the content. Indeed, upon being physically given the diskette, Bob may easily retrieve z from it and digitally sign it. This signature may then be given back to the mailman in the same diskette or in a different diskette. The mailman may indeed carry with him a device capable of checking Bob's signature. (This is quite feasible also because for signature checking such a device needs not to have access to any special secret).

Since Bob would be reading the message prior to signing it, it may be preferable to elicit first from Bob an ordinary generic receipt prior to giving him the diskette (in any case, the mailman can sign an affidavit that Bob accepted the diskette).

Alternatively, the diskette may contain not z, from which Bob may retrieve easily Alice's message, but information that pins down the message but does not yet reveal the message to Bob. For instance, the same value $y=E_{PO}(SIG_{PO}$ (ICM, recipient: B, z)) that we have envisaged the Post Office to send Bob in Step PO1. Only after Bob digitally signs y will the mailman enable Bob to retrieve Alice's message. For instance, the device carried by the mailman (preferably in a tamper-proof portion) may release a secret key by which Bob can remove the Post Office encryption layer. Alternatively, this key (or the right decryption, or information sufficient to decrypt anyway) can be sent, upon a proper signal, to the mailman, his device, or Bob directly by a variety of means (e.g., by phone, radio, etc.).

It should be understood that the present invention can be used to achieve additional properties, so as to yield other electronic transactions or make simultaneous other electronic transactions. For instance, the present ICM methods may be used to simultaneously sign contracts.

As for another example, it should also be appreciated that the ICM methods also yield very effective auctions methods with many bidding procedures (e.g., "public" or "secret" biddings). Indeed, Alice may be a bidder, Bob an entity handling the bids (e.g., deciding who are the winners of the auction, what goods are sold for what prices, how many units of a given good should be assigned to each bidder, and so on), and the message m for Alice to Bob is Alice's bid. Alice wishes to place her bid in return of a proper receipt, preferably one that can be used to prove (among other information, such as time information) the exact value of her bid. This way, if necessary, she can contest the "victory" of someone else. By means of our envisaged mechanisms for ICMs (in particular, of time information, encryption, and signatures), we can implement auctions in many different ways. Without any limitation intended, let us illustrate two possible implementations of two simple-minded auctions: one where the bidding process is "public" and one where it is "secret."

Consider first the following example of public bidding (which may occur, for instance, in a computer network). Assume there is a single indivisible good for sale in the auction, which will be assigned by a process combining both price and time. For making things cleaner, let us assume that there is a sequence of times $T_1, T_2, \ldots$ and $T'_1, T'_2, \ldots$ where $T_i \leq T'_i$ (e.g. $T'_i = T_i + \Delta$, where $\Delta$ is a fixed quantity.) A bidder gets the goods for a price P if there is an index/such that she has offered a price P within time $T_i$ and no higher price has been offered by time $T'_i$. (It is thus advisable that $T'_i$ be greater than $T'_i$, so that there is sufficient time to process all bids properly.)

The current status of the bid can be made available (e.g., by Bob), so that the bidders know what the highest offered price, P, at the "current" time, T, is. If Alice is willing to raise the price, she must do so before it is too late. Since her bid consists of her message to Bob, and it is assumed that the Sending-Receipt Method is in use, Alice then sends here bid to the Post Office in Step A1. If this transmission arrives within a useful time (i.e., before some time T'), the Post Office issues her a receipt with an indication of the proper time (interval), and then forwards her bid to Bob. Bob then processes the bids relative to the next time interval (e.g. announces the new highest price, or that the auction is over because no one offered more than the previous highest price).

As can be seen, the Post office may in this application be an entity cooperating with Bob, even for only auction purposes. Nonetheless, it may be preferable that it be made sufficiently independent from Bob. For instance, though prices are meant to be public, it is useful that bids are encrypted with Bob's key, so that the Post office will not know the content of a bid when it issues a receipt. Thus, in particular, it cannot be blamed to have refused to issue a receipt (e.g., by claiming that it had arrived too late) in order to favor a particular bidder. On the other hand, Bob, though capable to read the bids, is held back from cheating by the fact that the bidders have been issued valid and very informative receipts.

The system can be further enhanced so that the identity of the bidder is not revealed to Bob (at least as long as the auction is going on), but, say, only the price and time information. Also, at each time (interval), rather than making available just the new highest bid/price, Bob may make available all incoming (legitimate) bids, so that the volume of bidding is also learned by the bidders. Also, rather than processing the incoming bids in batches and in time intervals, Bob may process them one at a time (preferably in the order they got in) and with individual times. (e.g., he may still announce only the currently highest bid with its own individual time T, and when a bid with price P and time T is announced, and no higher price than P is offered before time T+$\Delta$ then the auction is over.) Again, return receipt may also be used in this application.

It should also be noted that if Alice has sent her bid in a very timely fashion and has not received any timely receipt within a certain time, then she may still time to take additional steps to ensure that her bid is properly delivered. Again, having two or more Post Offices, or Post Offices comprising a plurality of agents, may be very useful here because this enhance her chance of getting at least one valid receipt.

In particular the Post Office agents may be implementing a threshold cryptosystem. A plurality of Post Offices or multi-agent Post Offices may also benefit Bob, because he is better guaranteed that each bid will be properly forwarded to him. There may also be more than one Bob, and (each) Bob too may comprise several agents. It should be appreciated that if there are a multiplicity of agents involved it is also possible that Bob and the Post Office coincide, that is, that they simply are names for different functions performed by the same auctioning entity.

Notice also that the ICM methods may immediately accommodate secret bidding mechanism. Indeed, any of the methods above may be used for this purpose. For instance, consider batch-processing of bids when there is a single time interval T and a single, disjoint and subsequent time interval T'. Then the Post Offices issues receipts only for those bids received during T, and forwards all these bids to Bob, but only during T'. This way, no bid can be learned before the right time, unless there is an illegitimate cooperation between Bob and the Post Office (or sufficiently many agents). In all these scenarios, customization is quite useful since it also prevents that an enemy can copy Alice's bid so as to be guaranteed that he will win the auction if she does.

Finally, it should be noticed that the methods extend to more complex auctions, (e.g., there may be may goods of arbitrary nature—such as airwave bandwidths—, these goods may be divisible, and thus, for instance, the highest bid may take only a portion of a good, and so on.) In general it will be important to also indicate in each bid the particular, auction, good, and the like.

Although the invention has been described in detail, it should be appreciated that the scope of the invention is limited only, by the following claims.

What is claimed is:

1. A method of transmitting a message using a trusted party, comprising:
   a sender causing a customized version of the message to be provided to the trusted party, the customized version of the message having a first portion intelligible to the trusted party but not to a recipient of the message and a second portion intelligible to the recipient of the message but not to the trusted party;
   the trusted party examining the first portion of the customized version of the message to determine the recipient;
   the trusted party causing at least the second portion of the customized version of the message to be provided to the recipient; and
   the trusted party causing a receipt for the message to be provided to the sender.

2. An electronic communication method comprising:
   sending from a first party a message for a trusted party, the message having first and second portions, the first portion being intelligible to the trusted party, identifying a second party as a recipient of the second portion and being unintelligible to the second party, the second portion being unintelligible to the trusted party and intelligible to the second party; and
   receiving by the first party a receipt indicating that the second portion of the message was received by the second party.

3. The method of claim 2 wherein the first portion of the message is information encrypted to render it unintelligible to the second party.

4. The method of claim 2 wherein the second portion of the message is information encrypted to render it unintelligible to the trusted party.

5. The method of claim 2 further comprising signing at least one of the first and second portions of the message by the first party.

6. The method of claim 2 wherein the receipt includes a representation of the second portion of the message.

7. The method of claim 2 wherein the receipt includes a signature of at least the recipient.

8. The method of claim 2 wherein:
   the second portion includes information which has been processed to render it unintelligible to the trusted party and intelligible to the second party; and
   the second portion can be reconstructed using the information.

9. The method of claim 2 wherein an identity of the second party is intelligible from the message only by the trusted party.

10. The method of claim 2 wherein an identity of the second party is intelligible from the receipt only by the first party.

11. An electronic communication method comprising:
    receiving by a trusted party a message from a first party, the message having first and second portions, the first portion being intelligible to the trusted party, identifying a second party as a recipient of the second portion and being unintelligible to the second party, the second portion being unintelligible to the trusted party and intelligible to the second party;
    sending by the trusted party the second portion of the message to the second party; and
    sending by the trusted party to the first party a receipt indicating that the message was delivered to the second party.

12. The method of claim 11 wherein the first portion of the message is information encrypted to render it unintelligible to the second party.

13. The method of claim 11 wherein the second portion of the message is information encrypted to render it unintelligible to the trusted party.

14. The method of claim 11, wherein the message includes the first party's signature of at least one of the first and second portions of the message.

15. The method of claim 11 wherein:
    the second portion is information which has been processed to render it unintelligible to the trusted party and intelligible to the second party; and
    the message can be reconstructed using the information.

16. The method of claim 11 wherein an identity of the second party is intelligible from the message only by the trusted party.

17. The method of claim 11 wherein an identity of the second party is intelligible from the receipt only by the first party.

18. The method of claim 11 wherein sending the second portion of the message to the second party includes signing at least the second portion of the message with the trusted party's signature.

19. The method of claim 18 wherein sending the second portion of the message to the second party further comprises processing the signed second portion to render it intelligible to the second party but unintelligible to at least one party other than the second party.

20. The method of claim 11 wherein the receipt includes a representation of the second portion of the message.

21. The method of claim 11 wherein the receipt includes a signature of at least the recipient.

22. The method of claim 11 wherein sending the second portion of the message to the second party by the trusted party comprises:

generating by the trusted party a processed message which determines the second message but which is unintelligible to the second party;

sending the processed message to the second party by the trusted party;

receiving by the trusted party a receipt indicating that the second party received the processed message; and sending the second message to the second party in a form intelligible to the second party.

23. The method of claim 22 wherein the processed message can be reconstructed from the second message.

24. The method of claim 22 wherein the receipt indicating that the second party received the processed message includes a signature of the second party.

25. An electronic communication method comprising:

receiving by a receiver a first message from a trusted party, the message having a portion normally intelligible to the receiver which has been processed to render it unintelligible to the receiver;

sending by the receiver a receipt for the message to the trusted party; and receiving by the receiver a second message from the trusted party, the second message including the portion intelligible to the receiver.

26. The method of claim 25, wherein the receipt can be reconstructed using the portion of the second message intelligible to the receiver.

27. The method of claim 25, wherein the first message is intelligible to the trusted party.

28. The method of claim 25, wherein sending the receipt includes signing the first message by the receiver.

29. The method of claim 28, wherein sending the receipt further includes processing the receipt to render it intelligible to the trusted party but unintelligible to at least one other party.

* * * * *

Disclaimer

6,137,884 — Silvio Micali, Brookline, Mass. SIMULTANEOUS ELECTRONIC TRANSACTIONS WITH VISIBLE TRUSTED PARTIES. Patent dated Oct. 24, 2000. Disclaimer filed on April 25, 2013, by the Assignee, DocuSign, Inc.

The term of this patent shall not extend beyond the expiration date of Patent No. 5,553,145.

*(Official Gazette, June 25, 2013)*